(12) United States Patent
Goyal et al.

(10) Patent No.: US 7,305,379 B2
(45) Date of Patent: Dec. 4, 2007

(54) SYSTEM FOR AUTOMATED STORAGE MANAGEMENT FOR DATABASES

(75) Inventors: Pawan Goyal, San Jose, CA (US); William H. Tetzlaff, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/323,570

(22) Filed: Dec. 19, 2002

(65) Prior Publication Data

US 2004/0122799 A1    Jun. 24, 2004

(51) Int. Cl.
*G06F 17/30* (2006.01)

(52) U.S. Cl. ............... 707/2; 707/10; 707/1; 707/3; 709/224

(58) Field of Classification Search ............... 707/1–3, 707/10, 200; 709/224
See application file for complete search history.

(56) References Cited

U.S. PATENT DOCUMENTS

| | | | |
|---|---|---|---|
| 5,758,345 A | 5/1998 | Wang | |
| 6,272,503 B1 | 8/2001 | Bridge, Jr. et al. | |
| 6,272,598 B1 | 8/2001 | Arlitt et al. | |
| 6,330,621 B1 | 12/2001 | Bakke et al. | |
| 6,446,141 B1 | 9/2002 | Nolan et al. | |
| 7,167,915 B2 * | 1/2007 | Bendich et al. ............. | 709/224 |
| 2001/0034812 A1 | 10/2001 | Ignatius et al. | |
| 2002/0023181 A1 | 2/2002 | Brown et al. | |
| 2002/0026540 A1 | 2/2002 | Smyers | |
| 2002/0032816 A1 | 3/2002 | Bakke et al. | |
| 2002/0099914 A1 | 7/2002 | Matsunami et al. | |
| 2002/0129048 A1 | 9/2002 | Qiu et al. | |
| 2002/0129049 A1 | 9/2002 | Collins et al. | |
| 2002/0129216 A1 | 9/2002 | Collins | |
| 2002/0133539 A1 | 9/2002 | Monday | |
| 2002/0133669 A1 | 9/2002 | Devireddy et al. | |
| 2004/0054656 A1 * | 3/2004 | Leung et al. ............... | 707/1 |
| 2004/0098363 A1 * | 5/2004 | Anglin et al. ............... | 707/1 |
| 2004/0117408 A1 * | 6/2004 | Bharadwaj et al. ......... | 707/200 |

OTHER PUBLICATIONS

"A Policy-Based Storage Management Framework", Murthy Devarakonda, Jack Gelb, Avi Saha, and Jimmy Strickland, IEEE, Proceedings of the Third International Workshop on Policies for Distributed Systems and Networks (Policy '02), 2002, 4 pages.

(Continued)

*Primary Examiner*—Don Wong
*Assistant Examiner*—Sheree N Brown
(74) *Attorney, Agent, or Firm*—Gibb & Rahman, LLC (57) ABSTRACT

The invention provides a storage system that includes a policy manager. The policy manager has a user interface and a policy engine which encodes performance and workload requirements of tablespaces in a policy that is based on user input received through the user interface. Databases are connected to the policy manager and tablespaces are connected to the databases. The databases create the tablespaces, and the databases establish a storage allocation for the tablespace based on the policy. The policy manager detects if the tablespace is out of storage and automatically extends the storage allocation for the tablespace based on the policy, when the tablespace is out of storage.

20 Claims, 4 Drawing Sheets

OTHER PUBLICATIONS

"Management Issues for High-Performance Storage Systems", Steven Louis and Randall D. Burris, 1995 IEEE, pp. 336-348.

"Log-Only Temporal Object Storage", Kjetil Norvag and Kjell Bratbergsengen, 1997 IEEE, pp. 728-733.

"Oracle Partitioning Option", Oracle, Technical Data Sheet, Oracle 8i Internet, Mar. 1999, pp. 1-6 (Document was not included with other NPL).

"Storage Architecture", Learn 2, http://store.learn2.com/basket/assets/products/8387.asp?dept_id=4, Internet web page, Sep. 19, 2002, 2 pages.

* cited by examiner

SYSTEM FOR AUTOMATED STORAGE MANAGEMENT FOR DATABASES

BACKGROUND OF THE INVENTION

1. Field of the Invention

The present invention generally relates to storage systems and more particularly to an improved system that allocates an extensible tablespace based on a policy and manages a storage system based on the policy.

2. Description of the Related Art

In current systems, significant expertise is required by both database administrators (DBA) and storage administrators (SA) to manage storage for databases. They spend a significant amount of time together in managing storage for databases. Some of the problems they face are, initial configuration, system growth, and dynamic workload variations.

With respect to initial configuration, when a database application needs to be brought online, the DBA and SA have to go through a tedious process for laying out tables onto the storage. They have to inventory all the storage devices, determine their performance characteristics, determine the space available on all of them, estimate the space requirement for each of the tables, and then map all the tables onto the various devices. This process is currently manual and very error prone.

With respect to system growth, the storage requirements for database applications usually grow with time. If the DBA and SA incorrectly estimate the total amount of future space required for the numerous tables, then the database will run out of storage. This causes the application to fail resulting in application downtime. Resolution of this problem requires intervention by the database and storage administrators to allocate more storage and make it available to the appropriate table.

With respect to dynamic workload variations, the database workload varies over time. For example, the workload mix between Online Transaction Processing (OPT) and Decision Support System (DSS) may change. Furthermore, the query execution patterns may vary. The variations can create hot spots in the storage system. For example, initially a particular disk may receive very little requests. However, due to the change in query mix, that disk may start receiving a significant number of input/output (I/O) requests. Since the query mix and/or execution pattern itself changes over time, the disk that is "hot" (e.g., that is being used excessively when compared to normal usage patterns, or when compared to the other disks in the system) also keeps varying over time. It is difficult for the administrators, that are busy just keeping the system running, to continuously optimize the storage for the dynamically changing workload. This frequently results in sub-optimal storage performance.

Figure 1:
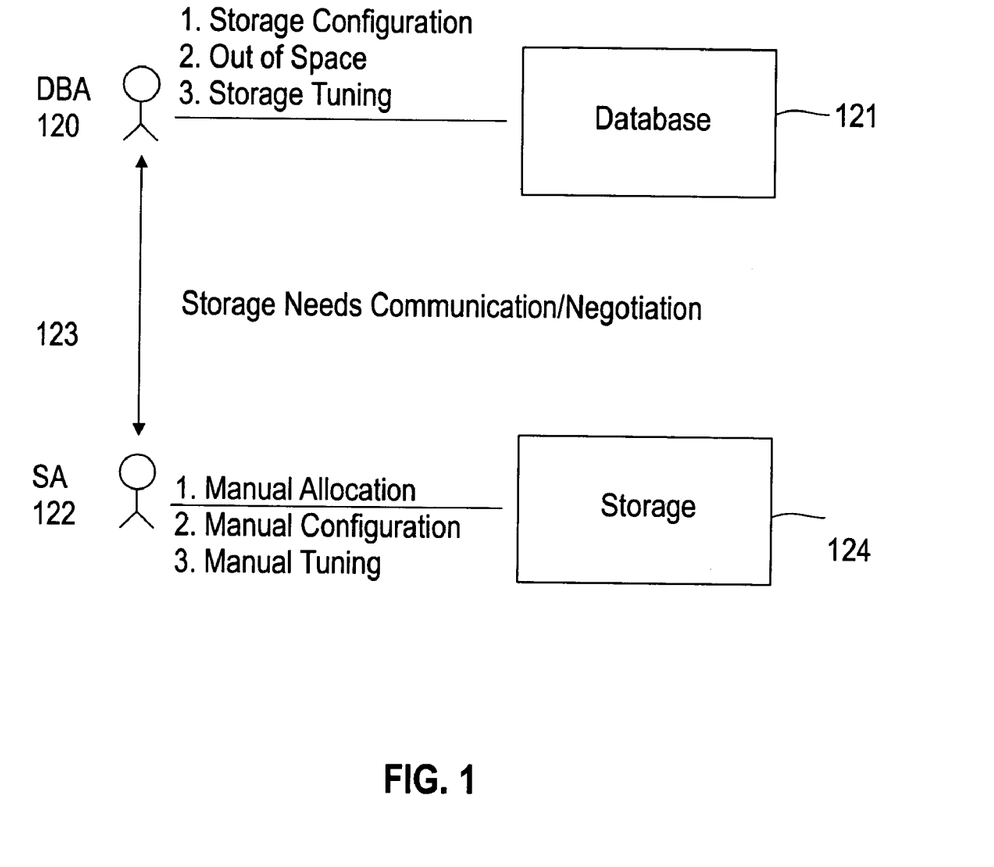
FIG. 1 is a schematic diagram of a conventional database/storage system.

These storage management problems result in a high cost of management for databases. FIG. 1 depicts that current situation in storage management for databases. More specifically, as shown in FIG. 1, the DBA 120 manually configures storage for the database 121, manages the database 121 to keep running out of space, and continually tunes the storage in the database 121. Similarly, the SA 122 manually allocates, configures, and tunes the different parts of the storage 124. Arrow 123 indicates the extensive management time and resources consumed between the DBA and SA in the negotiations and communication needed for resolution of the various storage needs.

Some tools have been developed by various software vendors to reduce the storage management costs for databases. For system growth, there are two different solutions for this problem. The first is Resumable Space Allocation from Oracle (Sunnyvale, Calif., USA). In this solution, a transaction/session can be marked resumable, if such a transaction runs out of space, it will be suspended and another transaction will be executed. The triggered transaction will usually log the error and may send an email/pager to the DBA. The DBA on notification can then add more storage for the appropriate table and resume the transaction. Though this solution stops an application from failing, it has very limited applicability. For example, consider an (on-line transaction processing) OLTP transaction that runs out of space. This solution will keep the transaction hanging until the DBA allocates space.

Another solution monitors storage space utilization (Quest/Precise, Mountain View Calif., USA) monitors the storage utilization of various tables and predicts when the tables will run out of space. When the storage utilization reaches certain threshold, it triggers the execution of a script. This script may send an email/page to the DBA or add some more storage from a predefined pool. This approach works to a limited extent as it cannot handle out of space error conditions during loading of tables or when the update activity has a surge. Furthermore, this solution is ad hoc as storage management functions such as inventory of free space and the policies for storage allocation all need to be encoded into it.

With respect to dynamic workload variations a software program Database Tuner from EMC (Sunnyvale Calif. USA) correlates storage performance with database level objects. Thus, such a program facilitates the determination of storage bottlenecks in the database; however, it does not continuously tune the storage system for optimal performance.

As described in detail below, this invention presents a method and a system for significantly reducing these management costs.

SUMMARY OF THE INVENTION

The invention manages a storage system that stores databases as storage objects in tablespaces. The invention encodes performance and workload requirements of the tablespaces in a policy and stores the policy in a storage policy manager. The database creates a tablespace for itself and, in the process, establishes a storage allocation for the tablespace based on the policy. During usage of the tablespace, the invention detects (using the database or an autonomic agent of the database) whether the tablespace is out of storage and automatically (without user intervention) extends the storage allocation for the tablespace based on the policy, when the tablespace is out of storage. The process of extending the tablespace is performed while the transaction that caused the table to run out of storage is still pending, thereby preventing the transaction from failing.

The invention also monitors the storage system by collecting information on response time, throughput, and utilization at storage disks and storage controllers to determining if the performance and workload requirements are being met by the storage system and adjusts the storage allocation to achieve the performance and workload requirements required by the policy. The storage policy manager maintains a plurality of policies, each of which has a unique name.

The invention also provides a storage system that includes a policy manager. The policy manager has a user interface and a policy engine which encodes performance and workload requirements of tablespaces in policies for storage allocation that are based on user input received through the user interface. Databases are connected to the policy manager and tablespaces are connected to the databases. The databases create the tablespaces, and the policy manager establishes a storage allocation for each of the tablespaces based on a named policy. The databases (e.g., autonomic agents of the databases) detects if a tablespace is out of storage and the policy manager automatically extends the storage allocation for the tablespace based on the policy. When the tablespace is out of storage.

The policy manager monitors the storage system and determines if the performance and workload requirements are being met by the storage system and adjusts the storage allocation to achieve the performance and workload requirements. The database is adapted to supply the storage policy manager with a policy name for the tablespace and the storage policy manager allocates an amount of additional storage to extend the tablespace that is permitted by the policy. The invention can also include an autonomic agent of the database that detects if the tablespace is out of storage. The policy manager allocates the additional storage to extend the tablespace during a tablespace transaction such that the transaction is prevented from failing. The system also includes monitors that collect information on response time, throughput, and utilization at storage disks and storage controllers.

With the invention, the database administrators and storage administrators do not have to manually do the layout as it is done by the policy. Furthermore, several storage related parameters (such as prefectsize, transferrate, etc.) do not have to be determined by the DBA; they are automatically determined by the tablespace and set to the appropriate values. This greatly simplifies the initial storage configuration for database.

To handle system growth related issues, the inventive system makes the policy managed tablespace automatically extensible. When a database detects it is out of space in a particular tablespace, it automatically requests additional storage using the policy name for the tablespace from the policy managed storage system. The storage system allocates storage that meets the requirements specified in the policy. This system does not require any manual intervention. Also, the invention ensures that an application will never run out of space as long as disk space is available in the system. Thus, the invention provides better application uptime.

BRIEF DESCRIPTION OF THE DRAWINGS

The invention will be better understood from the following detailed description of the invention with reference to the drawings, in which.

DETAILED DESCRIPTION OF PREFERRED EMBODIMENTS OF THE INVENTION

The policy managed extensible tablespace comprises a collection of tables. As mentioned above, conventional systems require the DBA to allocate storage for the tablespace by assigning a set of files or raw volumes to the tablespace at the time of its creation. In such conventional systems, the set of files or volumes is determined based on the performance requirements and the workload characteristics of the tablespace.

Currently, these requirements and workload characteristics are not externalized; they just manifest themselves in the file/volume allocation. To the contrary, the invention requires the DBA to externalize these storage requirements and workload characteristics and encode them in a policy. With the invention, storage is not allocated by the DBA at the time of tablespace creation; instead the DBA just specifies the requirements for the storage for the tablespace by just specifying the policy.

Figure 2:
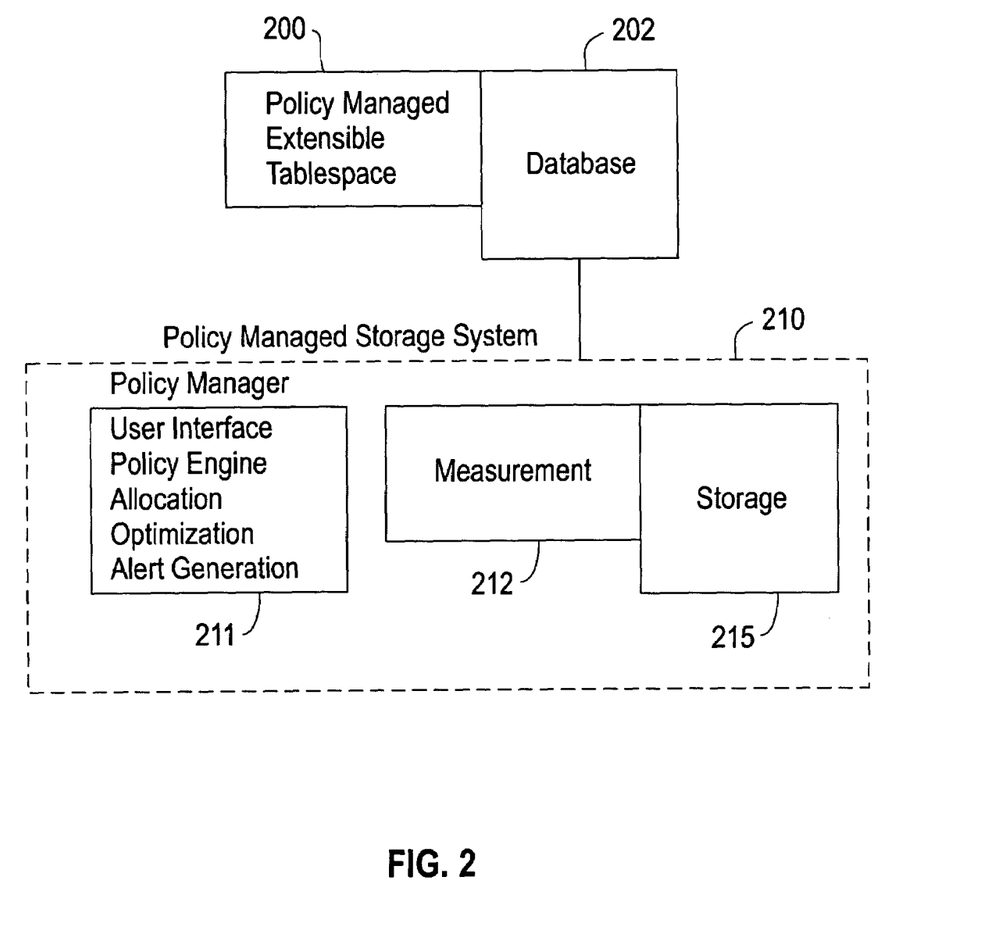
FIG. 2 is a schematic diagram of a database/storage system according to the invention.

The invention provides policy managed extensible tablespaces 200 and a policy managed storage system. As shown in FIG. 2, the invention includes a policy managed extensible tablespace 200 connected to the database 202. In addition, the invention provides a policy managed storage system 210 that includes a policy manager 211 and a measurement engine 212 (both of which are operatively connected to the storage 215). The policy manager 211 includes a user interface, a policy engine, allocation database, optimizer, and an alert generator. The database 202 stores storage objects in the storage 215. The database 202 places a dynamically-varying workload on the storage 215. With the inventive system, the storage allocation is done by the policy managed storage system 210. The database contacts the storage system 210 with the policy name for storage allocation and the storage system 210 allocates storage (file or volume based on the policy) and gives it back to the database.

Thus, the invention provides a method for managing a storage system based on a storage policy for use with a database. The system stores the database as storage objects and has a dynamically-varying workload. The invention encodes the performance requirements and workload characteristics of tablespaces in a policy and stores the policy in a storage policy manager.

The database creates a policy managed tablespace. The storage policy manager is contacted for the storage allocation for the tablespace based on the policy name. The storage policy manager allocates storage based on the policy and the database uses the allocated storage for the tablespaces.

During database transactions, the storage allocation for the tablespace is extended on demand. The database or its autonomic agent detects that the tablespace is out of storage and the policy manager for the storage system is contacted with the policy name for the tablespace. The storage policy manager allocates additional storage based on the policy and the database uses the storage allocated and continues without failing the transaction.

In addition, the invention monitors the performance of the tablespace and the storage system (in terms of throughput and response time) and determines if the performance and workload requirements are met by the storage system. More specifically, the invention collects performance information such as response time, throughput, and utilization at the disk and storage controllers. The invention transports this performance information to the policy manager and stores such information in a performance database. The invention analyzes the performance data and converts it into metric specified in the policy. The invention then compares the observed metrics with the metrics specified in the policy to determine if there is a performance/workload requirement problem.

If there is a performance/workload problem, the invention adjusts the storage allocation of the tablespace to achieve performance and workload requirements. More specifically, the invention creates a new storage configuration that will not have the performance problems of the current configuration and moves the storage objects in the tablespaces to the new configuration.

To further illustrate, in DB2 a DBA creates a tablespace by using the following command:

```
create tablespace managed by database using
    (device /dev/rdb1 512
    device /dev/rdb2 1024,
    prefetchsize 32, extentsize 4, transferrate 10, . . . )
```

To the contrary, with the invention creation of a policy managed tablespace command gets simplified to:

create tablespace managed by policy using (policy medium)

where medium is the name of a policy.

One advantage of the policy managed tablespace 200 is that the DBA and storage administrators do not have to manually do the layout; it is done by the policy. Furthermore, several storage related parameters (such as prefectsize, transferrate, etc.) do not have to be determined by the DBA; they are automatically determined by the tablespace 200 and set to the appropriate values. This greatly simplifies the initial storage configuration for database.

To handle system growth related issues, the inventive system makes the policy managed tablespace 200 extensible. When a database detects it is out of space in a particular tablespace, it automatically requests additional storage using the policy name for the tablespace from the policy managed storage system 210. The storage system 210 allocates storage that meets the requirements specified in the policy. This system 210 does not require any manual intervention. Also, the invention ensures that an application will never run out of space as long as disk space is available in the system 210. Thus, the invention provides better application uptime.

The inventive policy managed storage system 210 is also responsible for allocating storage 215 based on the specified policy, monitoring the storage 215 performance to determine if the policy goals are being met, and re-organizing the storage objects to ensure that the policy goals are met and the system is "optimized" for the dynamically varying workload. Monitoring and reallocation can be performed according to a system disclosed in copending U.S. patent application Ser. No. 10/159,494 (SJ09-2002-0051), which is incorporated herein by reference.

Figure 3:
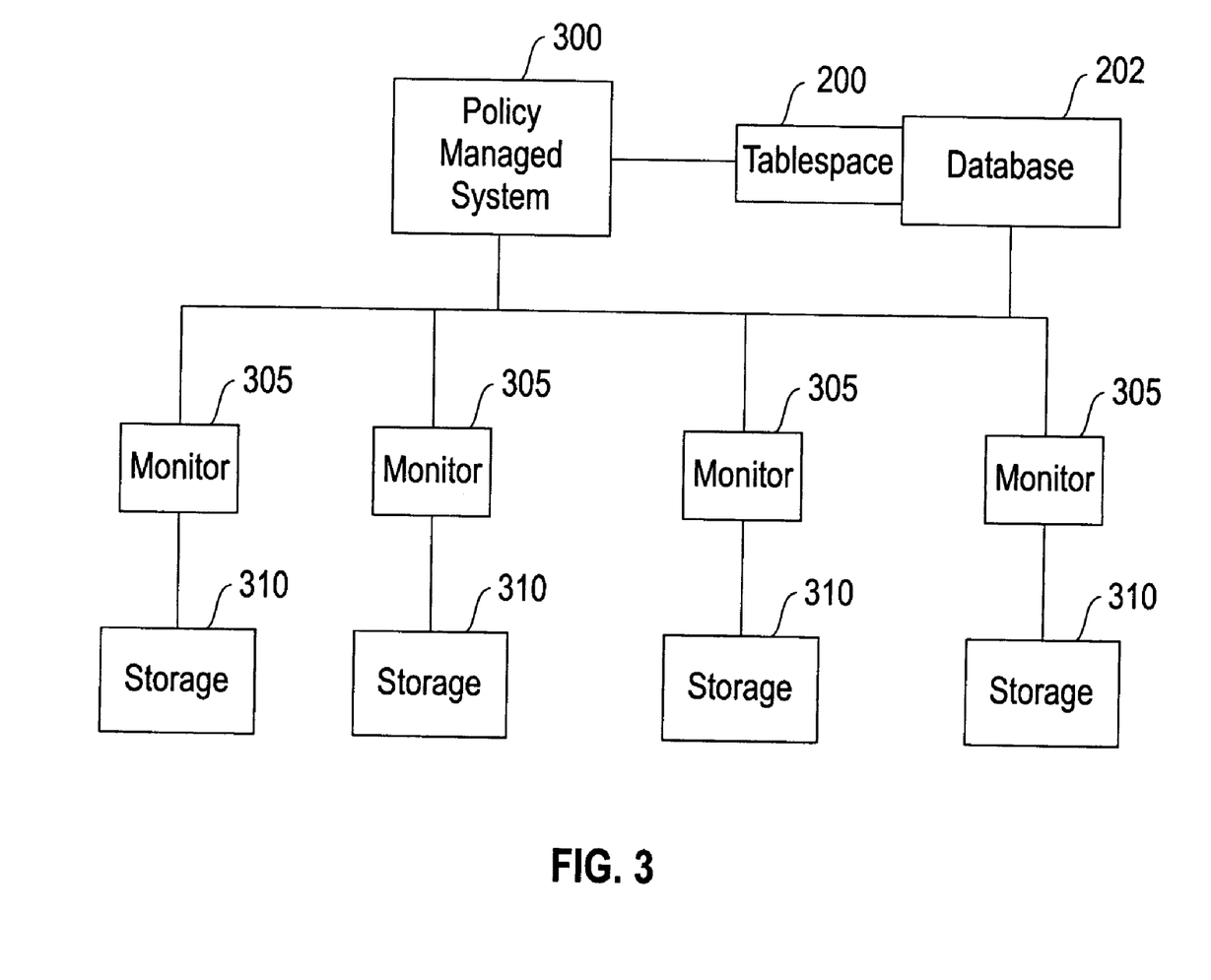
FIG. 3 is a schematic diagram of a storage system according to the invention.
Figure 4:
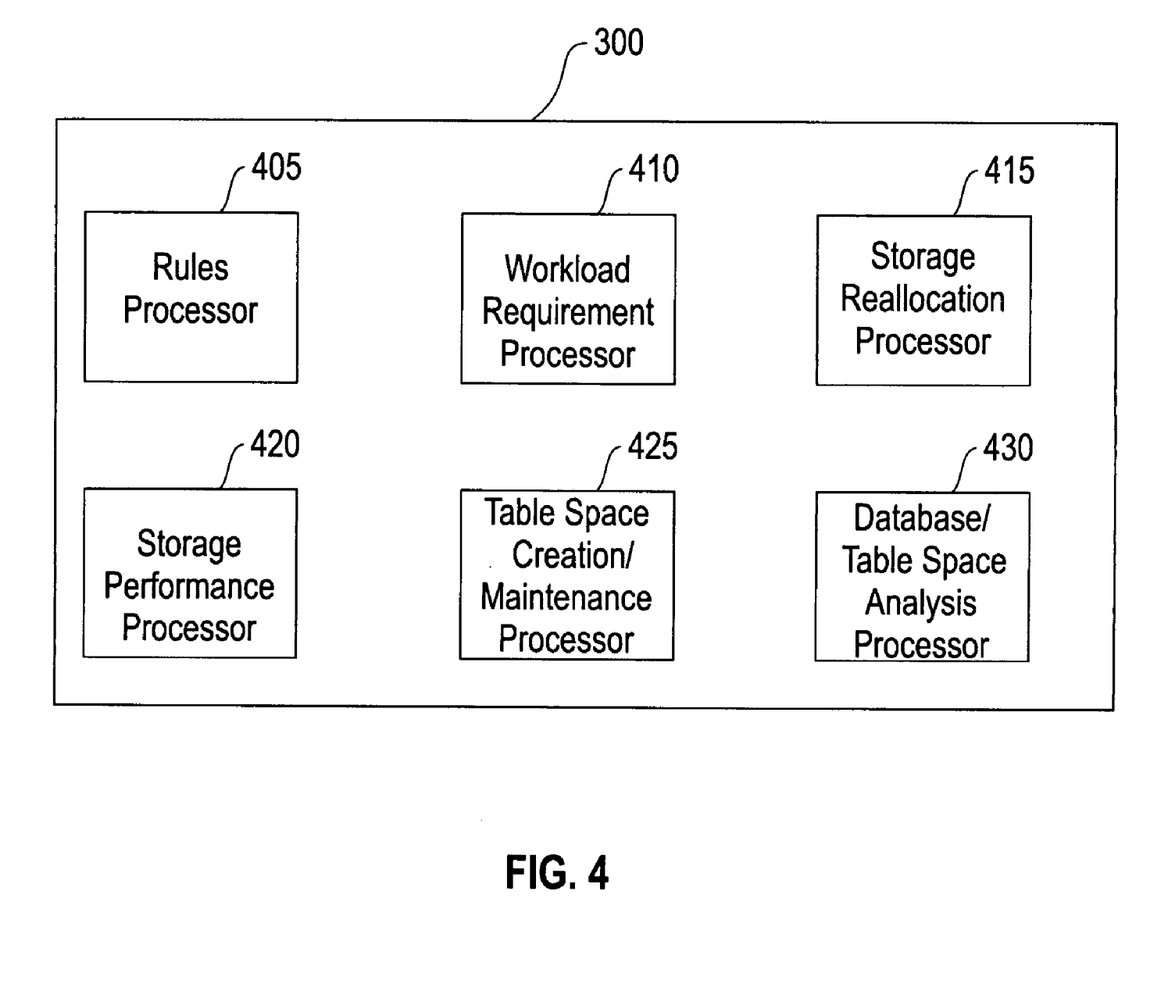
FIG. 4 is a detailed schematic diagram of the storage system shown in FIG. 3.

FIG. 3 illustrates one embodiment of the invention. As shown in FIG. 3, monitors 305 monitor the activity, the available storage, latency and throughput speeds, and other performance characteristics of storage units 310. While FIG. 3 illustrates a single monitor for each storage unit, each storage unit could have multiple monitors or each monitor could keep track of multiple storage units. The policy managed system 300 is in communication with the monitors 305 as well as the tablespace 200 and the database 202. FIG. 4 illustrates the policy managed system 300 in greater detail. As shown in FIG. 4, the policy manage system 300 and includes a number of processors each of which can comprise separate processors or a number of different processor functions can be included in a single processor.

The rules processor 405 maintains and applies the policy rules input by the storage administrator 122 and the database administrator 120 through the user interface shown in FIG. 2. These policy rules can include specific restrictions as to which of the storage units 310 can be made available for the tablespace 200 and database 202. In addition, the policy rules can describe what types of tablespaces/databases can be stored in the different storage units 310. For example, one of the storage units may be specifically dedicated to a single database and therefore not available to any other databases. Similarly, the different databases can have different priorities, and a limited number of storage units can be reserved for the exclusive use of those databases having priority characteristics above a certain predetermined threshold value.

The policy managed system includes a storage performance processor 420 that tracks the current and past performance characteristics of the different storage units 310 by keeping current and historical information output by the monitors 305. In addition, the policy managed system 300 includes a database/tablespace analysis processor 430 that analyzes the performance needs of the database and tablespace. More specifically, the database/tablespace analysis processor 430 maintains a history of the types of input/output requests, the frequency of input/output requests, as well as the severity and frequency of instances when a database is made to wait for information, and other similar information categories, in order to create a profile of performance needs for each of the different databases/tablespaces the policy managed system 300 will process. In addition, the policy managed system 300 includes a workload requirement processor 410 which can process estimated information of a new database being added to the system based on the same types of information input into the database/tablespace analysis processor 430 that are entered as estimates through the user interface. In both cases, the database/tablespace analysis processor 430 and the workload requirement processor 410 both create the profile of performance needs for a given database/tablespace.

Such profiles of performance needs can be used by the rules processor 405 because the rules processor 405 also can include rules that require the policy managed system 300 to match the performance needs of the different databases and tablespaces to the performance characteristics exhibited by the different storage units 310. Therefore, the rules can include an instruction to match databases and tablespaces having the highest performance needs with storage units that have the highest performance characteristics (in terms of input/output transactions, latency, throughput, etc.).

In addition, the policy managed system 300 includes a storage reallocation processor 415 that continually monitors whether the needs of the different databases and tablespaces are being met (as discussed above) and whether the usage of the different storage units 310 is balanced. Therefore, for example, the storage reallocation processor 415 through information provided by the monitors 305 can determine if a specific storage unit is processing a substantially larger percentage of input/output requests when compared to the average number of input/output requests processed by the remaining storage units within a specified grouping. Similarly, the storage reallocation processor 415 maintain statistics on the percentage of the space available within each of the storage units.

The rules processor 405 could include rules requiring all databases to receive equal attention to their performance needs, and/or that demands placed upon the storage units should be equalized. Alternatively, the rules processor 405 may give certain storage units and databases a priority over other storage units in databases. In response to such rules, the storage reallocation processor 415 reallocates portions of tablespaces and databases to different storage units in order to comply with the various rules.

Also included in the policy managed system is a tablespace creation/maintenance processor 425. Through information provided by the monitors 305, the tablespace creation/maintenance processor 425 inventories all storage devices 310 to determine their performance characteristics and determine the space available space. From the database/tablespace analysis processor 430 and the workload requirement processor 410, the tablespace creation/maintenance processor 425 estimates the space requirement for each of the tables. The tablespace creation/maintenance processor 425 then maps the table to the storage and 310 having the necessary storage space and performance requirements. In addition, the tablespace creation/maintenance processor 425 monitors all tablespaces and databases and reallocate portions of (or the entire) tablespaces and databases to different storage units 310 in order to prevent the tablespaces and databases from running out of storage.

Thus, with the invention, the DBA and storage administrators do not have to manually do the layout of the tablespace because it is done by the policy. Furthermore, several storage related parameters (such as prefectsize, transferrate, etc.) do not have to be determined by the DBA; because they are automatically determined by the tablespace which sets the appropriate values. The invention greatly simplifies the initial storage configuration for database.

To handle system growth related issues, the inventive system makes the policy managed tablespace extensible. The storage system allocates storage that meets the requirements specified in the policy. This system does not require any manual intervention. Also, the invention ensures that an application will never run out of space as long as disk space is available in the system. Thus, it provides better application uptime.

While the invention has been described in terms of preferred embodiments, those skilled in the art will recognize that the invention can be practiced with modification within the spirit and scope of the appended claims.

What is claimed is:

1. A method for managing a storage system that stores databases as storage objects in tablespaces, said method comprising:

storing in a policy manager policies for storage allocation, wherein each of said policies is named and specifies performance and workload requirements for tablespaces;

receiving, by said database, a command to create a tablespace, wherein said command specifies by name a policy;

creating, by a database, said tablespace;

establishing, by said policy manager, a storage allocation for said tablespace based on said policy;

detecting if said tablespace is out of storage, wherein said detecting comprises using an autonomic agent of said database to detect whether said tablespace is out of storage;

automatically, and without user intervention, extending said storage allocation for said tablespace based on said policy, when said tablespace is out of storage;

monitoring said storage system and determining if said performance and workload requirements are being met by said storage system; and adjusting said storage allocation to achieve said performance and workload requirements, wherein said detecting process is performed during a tablespace transaction and said extending process is performed while said transaction is pending, without failing said transaction.

2. The method in claim 1, wherein said extending of said storage allocation comprises:

said database supplying said storage policy manager with said name of said policy for said tablespace; and said storage policy manager allocating an amount of additional storage that is permitted by said policy.

3. The method in claim 1, wherein said detecting if said tablespace is out of storage is performed by one of said database and an autonomic agent of said database.

4. The method in claim 1, wherein said monitoring comprises collecting information on response time, throughput, and utilization at storage disks and storage controllers.

5. A method for managing a storage system that stores databases as storage objects in tablespaces, said method comprising:

storing in a policy manager policies for storage allocation, wherein each of said policies is named and specifies performance and workload requirements for tablespaces;

receiving, by said database, a command to create a tablespace, wherein said command specifies by name a policy;

creating, by a database, tablespace;

establishing, by said storage policy manager, a storage allocation for said tablespace based on said policy;

detecting if said tablespace is out of storage, wherein said detecting comprises using an autonomic agent of said database to detect whether said tablespace is out of storage; and automatically, and without user intervention, extending said storage allocation for said tablespace based on said policy, when said tablespace is out of storage, wherein said detecting process is performed during a tablespace transaction and said extending process is performed while said transaction is pending, without failing said transaction.

6. The method in claim 5, wherein said extending of said storage allocation comprises:

said database supplying said storage policy manager with said name of said policy for said tablespace; and said storage policy manager allocating an amount of additional storage that is permitted by said policy.

7. The method in claim 5, wherein said detecting if said tablespace is out of storage is performed by one of said database and an autonomic agent of said database.

8. A storage system comprising:

a storage policy manager adapted to store policies for storage allocation that are named and that specify performance and workload requirements for tablespaces;

at least one database connected to said policy manager; and storage connected to said at least one database and said policy manager, wherein said database is adapted to receive a command to create a tablespace, wherein said command specifies by name a policy, wherein said database is further adapted to creates said tablespace based on said command, wherein said policy manager establishes a storage allocation for said tablespace in said storage based on said policy, wherein said database is further adapted to use an autonomic agent to detect if said tablespace is out of storage during a tablespace transaction, wherein said policy manager is further adapted to automatically, and without user intervention, extend said storage allocation for said tablespace based on said policy, when said tablespace is out of storage, so as to prevent said transaction from failing, and wherein said policy manager is further adapted to monitor said storage system to determine if said performance and workload requirements are being met by said storage system and to adjust said storage allocation to achieve said performance and workload requirements.

9. The storage system in claim 8, wherein said database is adapted to supply said storage policy manager with said name of said policy for said tablespace; and said storage policy manager is adapted to allocate an amount of additional storage to extend said tablespace that is permitted by said policy.

10. The storage system in claim 8, further comprising an autonomic agent of said database adapted to detect if said tablespace is out of storage.

11. The storage system in claim 8, further comprising monitors connected to said database, said policy manager and said storage, wherein said monitors are adapted to collect information on response time, throughput, and utilization at storage disks and storage controllers and to transmit said information to said policy manager.

12. A storage system comprising:

a storage policy manager adapted to store policies for storage allocation that are named and that specify performance and workload requirements for tablespaces;

at least one database connected to said policy manager; and storage connected to said at least one database and said policy manager, wherein said database is adapted to receive a command to create a tablespace, wherein said command specifies a policy by name, wherein said database is further adapted to creates said tablespace based on said a command wherein said policy manager establishes a storage allocation for said tablespace in said storage based on said policy, wherein said database is further adapted to use an autonomic agent to detect if said tablespace is out of storage during a tablespace transaction, and wherein said policy manager is adapted to automatically, and without user intervention, extend said storage allocation for said tablespace based on said policy, when said tablespace is out of storage, so as to prevent said transaction from failing.

13. The storage system in claim 12, wherein said database is adapted to supply said storage policy manager with said name of said policy for said tablespace; and said storage policy manager is adapted to allocate an amount of additional storage to extend said tablespace that is permitted by said policy.

14. The storage system in claim 12, further comprising an autonomic agent of said database adapted to detect if said tablespace is out of storage.

15. The storage system in claim 12, further comprising monitors connected to said database, said storage and said policy manager, wherein said monitors are adapted to collect information on response time, throughput, and utilization at storage disks and storage controllers and to transmit said information to said policy manager.

16. A program storage device readable by machine, tangibly embodying a program of instructions executable by the machine to perform a method for managing a storage system that stores databases as storage objects in tablespaces, said method comprising:

storing in a policy manager policies for storage allocation, wherein each of said policies is named and specifies performance and workload requirements for tablespaces;

receiving, by said database, a command to create a tablespace, wherein said command specifies by name a policy;

creating, by a database, said tablespace;

establishing, by said storage policy manager, a storage allocation for said tablespace based on said policy;

detecting if said tablespace is out of storage, wherein said detecting comprises using autonomic agents of said database to detect whether said tablespace is out of storage; and automatically, and without user intervention, extending said storage allocation for said tablespace based on said policy, when said tablespace is out of storage, wherein said detecting process is performed during a tablespace transaction and said extending process is performed while said transaction is pending, without failing said transaction.

17. The program storage device in claim 16, wherein said extending of said storage allocation comprises:

said database supplying said storage policy manager with said name of said policy for said tablespace; and said storage policy manager allocating an amount of additional storage that is permitted by said policy.

18. The program storage device in claim 16, wherein said detecting if said tablespace is out of storage is performed by one of said database and an autonomic agent of said database.

19. The program storage device in claim 16, wherein monitoring comprises collecting information on response time, throughput, and utilization at storage disks and storage controllers.

20. The program storage device of claim 16, further comprising monitoring said storage system and determining if said performance and workload requirements are being met by said storage system; and adjusting said storage allocation to achieve said performance and workload requirements.

* * * * *